(12) United States Patent
Babin et al.

(10) Patent No.: US 6,703,828 B2
(45) Date of Patent: Mar. 9, 2004

(54) MECHANICAL DESIGN FOR A SENSOR TO PREVENT AN ICE LOCK CONDITION

(75) Inventors: Brian George Babin, Goshen, IN (US); Todd Anthony Brown, Elkhart, IN (US)

(73) Assignee: American Electronic Components, Inc., Elkhart, IN (US)

( * ) Notice: Subject to any disclaimer, the term of this patent is extended or adjusted under 35 U.S.C. 154(b) by 0 days.

(21) Appl. No.: 09/912,908

(22) Filed: Jul. 25, 2001

(65) Prior Publication Data

US 2003/0020464 A1 Jan. 30, 2003

(51) Int. Cl.[7] ................................................. G01B 7/30
(52) U.S. Cl. ................................ 324/207.25; 324/207.2
(58) Field of Search ......................... 324/207.2, 207.25, 324/207.21, 207.22; 123/406.52

(56) References Cited

U.S. PATENT DOCUMENTS

| | | | |
|---|---|---|---|
| 4,589,676 A | | 5/1986 | Meloche et al. ......... 280/5.515 |
| 4,614,247 A | | 9/1986 | Sullivan .................. 180/24.02 |
| 4,789,826 A | * | 12/1988 | Willett ................... 324/207.2 |
| 4,809,957 A | | 3/1989 | Schonfeld et al. ....... 267/64.11 |
| 4,822,063 A | | 4/1989 | Yopp et al. .............. 280/6.157 |
| 5,365,168 A | * | 11/1994 | Reichl .................... 324/207.16 |
| 5,484,162 A | | 1/1996 | Kanoh et al. ........... 280/6.157 |
| 5,497,081 A | * | 3/1996 | Wolf et al. ............. 324/207.12 |
| 5,544,000 A | * | 8/1996 | Suzuki et al. .............. 361/139 |
| 5,777,471 A | * | 7/1998 | Stoll et al. ............. 324/207.25 |
| 5,789,917 A | * | 8/1998 | Oudet et al. ............. 324/207.2 |
| 6,098,967 A | | 8/2000 | Folchert .................. 267/64.16 |
| 6,252,394 B1 | * | 6/2001 | Roze et al. ............ 324/207.12 |
| 6,316,935 B1 | * | 11/2001 | Vanzuilen ............. 324/207.21 |
| 6,323,643 B1 | * | 11/2001 | Kordecki ................. 324/207.2 |
| 6,356,073 B1 | * | 3/2002 | Hamaoka et al. ........ 324/207.2 |
| 6,367,337 B1 | * | 4/2002 | Schlabach ............. 73/862.331 |
| 6,396,259 B1 | * | 5/2002 | Washeleski et al. ... 324/207.22 |

\* cited by examiner

*Primary Examiner*—N. Le
*Assistant Examiner*—Darrell Kinder
(74) *Attorney, Agent, or Firm*—Katten Muchin Zavis Rosenman; John S. Paniaguas

(57) ABSTRACT

A rotary position sensor which includes a molded housing with a central aperture forming a drive arm cavity, a drive arm assembly and a rotor plate. The drive arm assembly carries a circular magnet and a shunt ring and is rotatably received within the drive arm cavity. The drive arm assembly is formed with an extending stud for connection to an external mechanical lever. The rotor plate is used to close the drive arm cavity and carries a magnetic flux responsive element and one or more flux concentrators and optional flux shunt. The molded housing, drive arm assembly and rotor plate are configured to minimize air space within the drive arm cavity after the sensor is assembled. By minimizing air spaces within the drive arm cavity, the amount of ice build up within the drive arm cavity is minimized. In addition, to further prevent a condition of ice lock of the drive arm assembly relative to the molded housing, all surfaces within the drive arm cavity are formed as smooth surfaces.

4 Claims, 5 Drawing Sheets

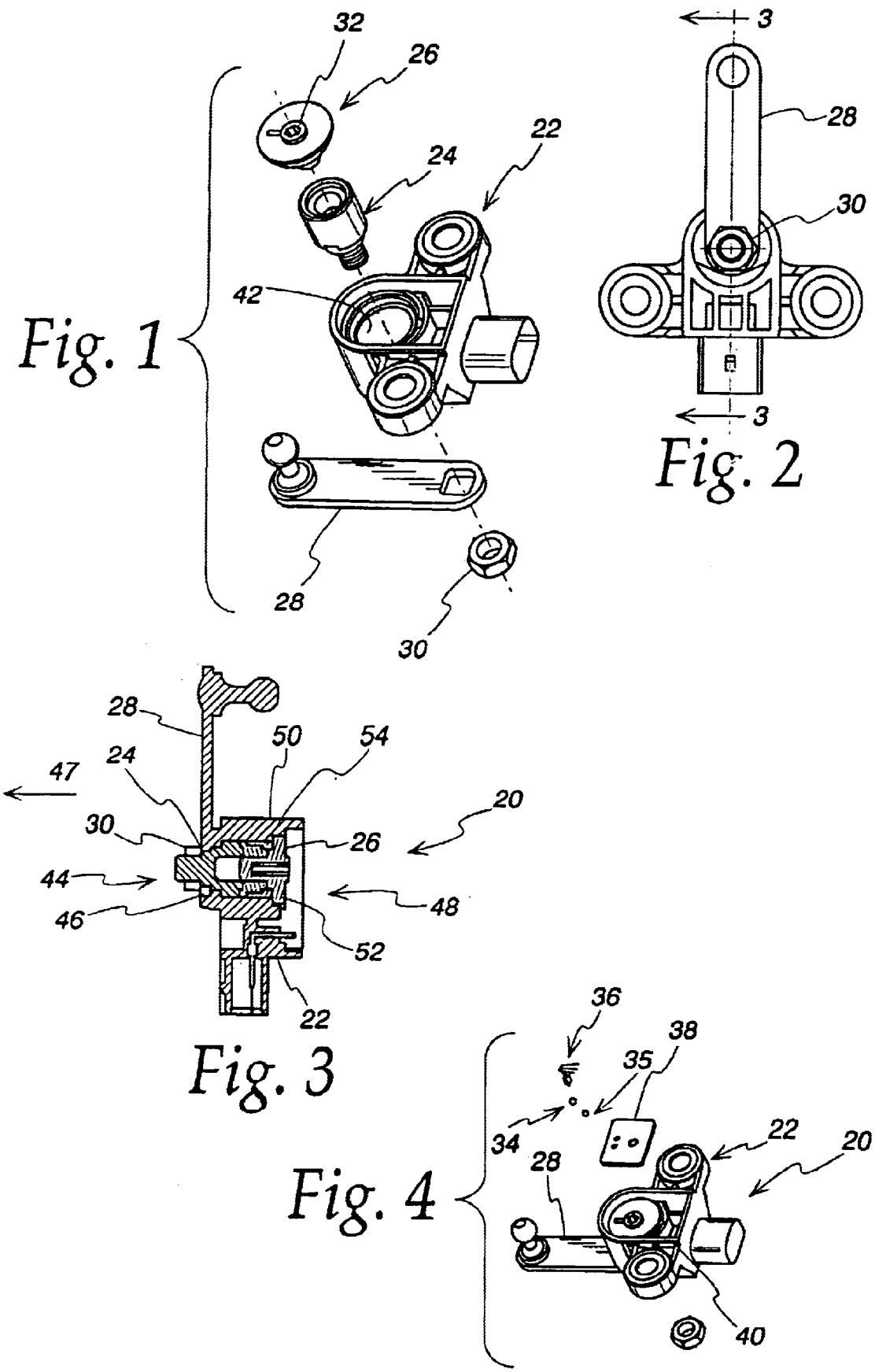

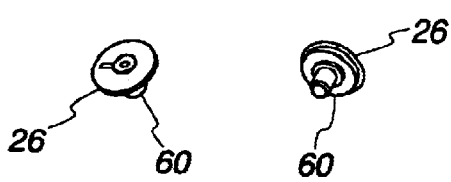
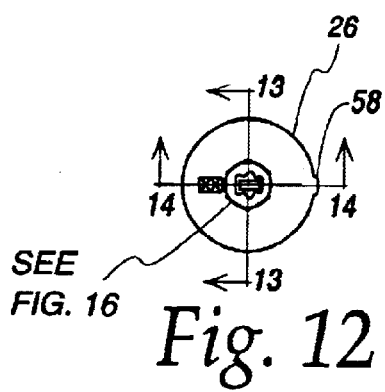
Fig. 11a  Fig. 11b  Fig. 12
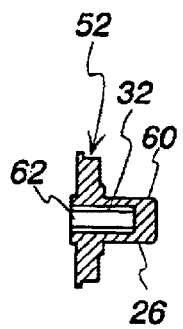
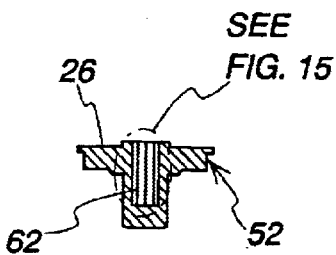
Fig. 13  Fig. 14
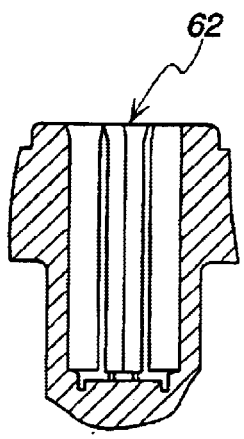
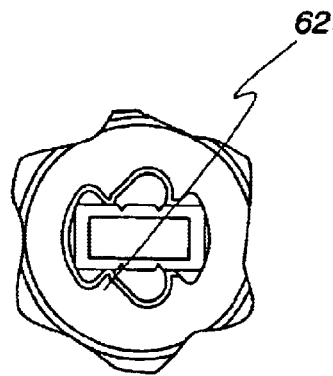
Fig. 15  Fig. 16

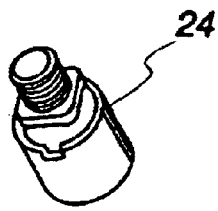
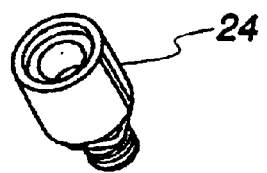
*Fig. 17a*   *Fig. 17b*
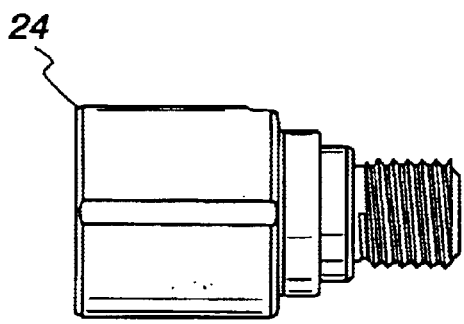
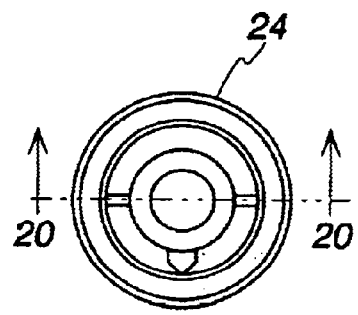
*Fig. 18*   *Fig. 19*
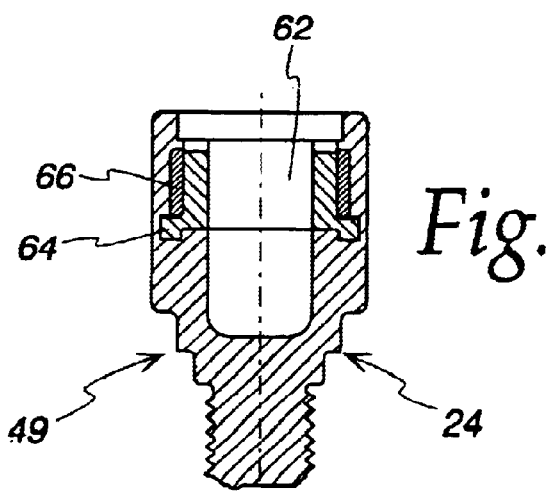
*Fig. 20*
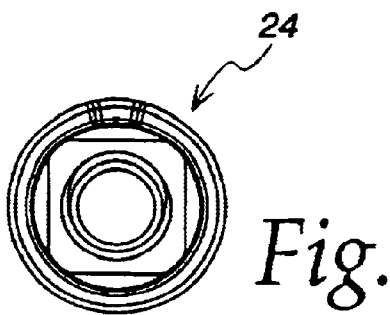
*Fig. 21*

MECHANICAL DESIGN FOR A SENSOR TO PREVENT AN ICE LOCK CONDITION

BACKGROUND OF THE INVENTION

1. Technical Field of the Invention

The present invention relates to a sensor and more particularly to a sensor, such as a rotary position sensor, which includes a main housing and a rotatable drive arm assembly that is configured to prevent ice locking of the drive arm assembly relative to the main housing.

2. Description of the Prior Art

Various sensors are used in automotive applications. Sensors utilized in such automotive applications must be able to perform their intended function over a relatively wide temperature range, for example, −20° F. to 120° F., as well as be tolerant of various climate conditions, such as ice, rain and sleet. Of the various sensors utilized in automotive applications, rotary position sensors are known and used in various applications on an automobile, such as sensing the butterfly position on a throttle body (throttle position sensor); sensing the relative position of the vehicle body relative to the chassis (ride height sensor) and sensing the position of the transmission shift lever (transmission shift position sensor). Such sensors, such as the ride height sensor, are located on the underside of an automobile and are thus subject to harsh environmental conditions and potential failure from such conditions. In particular, such rotary position sensors are normally formed with a stationery housing rigidly and a rotatable drive arm assembly. During relatively harsh environmental conditions, moisture is known to seep into the main housing and freeze creating an ice lock condition preventing a rotatable drive arm from rotating. Such a condition causes incorrect position signals to be generated by the rotary position sensor. Accordingly, automotive systems that are responsive to such data may operate improperly. Moreover, ice lock of the drive arm assembly could result in damage or catastrophic failure of the rotary position sensor requiring replacement. Accordingly, there is a need for a rotary position sensor which minimizes if not eliminates an ice lock condition and provides reliable sensor output in all environmental conditions.

SUMMARY OF THE INVENTION

Briefly, the present invention relates to a rotary position sensor which includes a molded housing with a central aperture forming a drive arm cavity, a drive arm assembly and a rotor plate. The drive arm assembly carries a circular magnet and a shunt ring and is rotatably received within the drive arm cavity. The drive arm assembly is formed with an extending stud for connection to an external mechanical lever. The rotor plate is used to close the drive arm cavity and carries a magnetic flux responsive element and one or more flux concentrators and optional flux shunt, if required. The molded housing, drive arm assembly and rotor plate are configured to minimize air space within the drive arm cavity after the sensor is assembled. By minimizing air spaces within the drive arm cavity, the amount of ice build up within the drive arm cavity is minimized. In addition, to further prevent a condition of ice lock of the drive arm assembly relative to the molded housing, all surfaces within the drive arm cavity are formed as smooth surfaces.

DESCRIPTION OF THE DRAWINGS

These and other advantages of the present invention will be readily understood with reference to the following specification and attached drawing wherein:

FIG. 1 is an exploded perspective view of a rotary position sensor formed with a housing in accordance with the present invention, shown without a printed circuit board, magnetic flux responsive element and flux concentrators or encapsulation material, such as epoxy.

FIG. 2 is a top view of the rotary position sensor illustrated in FIG. 1.

FIG. 3 is a sectional view along line 3—3 of the FIG. 2.

FIG. 4 is similar to FIG. 1 illustrating the rotary position sensor in accordance with the present invention partially assembled with the printed circuit board, magnetic flux responsive element and flux concentrators shown exploded.

FIGS. 11A and 11B are perspective views of a rotor plate in accordance with the present invention.

FIG. 12 is a top view of the rotor plate illustrated in FIGS. 11A and 11B.

FIG. 13 is a sectional view along line 13—13 of FIG. 12.

FIG. 14 is a sectional view along line 14—14 of FIG. 12.

FIG. 15 is a detailed view of a portion of the rotor plate illustrated in FIG. 14.

FIG. 16 is a detailed view of a portion of the rotor plate illustrated in FIG. 12.

FIGS. 17A and 17B are perspective views of a drive arm assembly in accordance with the present invention.

FIG. 18 is a side view o f the drive arm assembly illustrated in FIGS. 17A and 17B.

FIG. 19 is a bottom view of the drive arm assembly illustrated in FIG. 18.

FIG. 20 is a sectional view along line 20—20 of FIG. 19.

FIG. 21 is a top view o f the drive arm assembly illustrated in FIG. 18.

DETAILED DESCRIPTION

Figure 5:
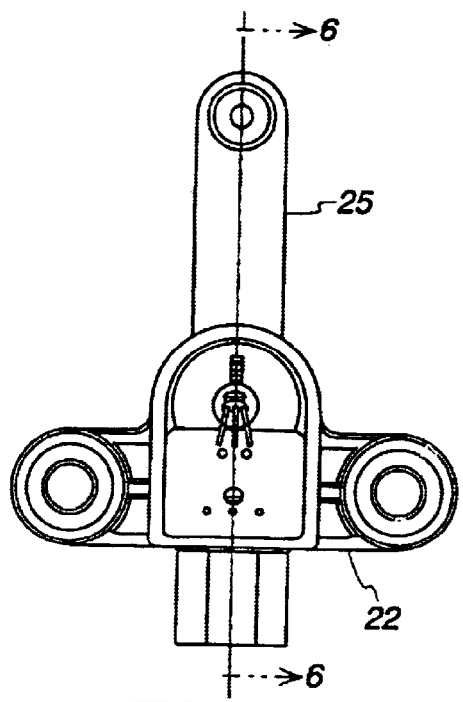
FIG. 5 is a bottom view of the rotary position sensor illustrated in FIG. 4.

The present invention relates to a rotary position sensor and more particularly to a configuration for a rotary position sensor suitable for use in relatively extreme environmental conditions that is configured to minimize an ice lock condition. The rotary position sensor, generally identified with the reference numeral 20, includes a molded housing 22, a drive arm assembly 24 and a rotor plate 26 and is configured to minimize air cavities within the assembled sensor by configuring various component parts with minimal clearances with respect to each other. In addition, all surfaces within the sensor housing 22 are formed as smooth surfaces. With such a configuration, the amount of air space within the sensor is minimized which minimizes the amount of water which can seep into the interior of the sensor and freeze and potentially cause ice locking of the drive arm assembly 24 relative to the molded housing 22.

A lever arm assembly 28, which does not form part of the present invention, may be attached to the drive arm assembly 24 by a suitable fastener 30. The lever arm 28 is adapted to be mechanically coupled to an external device whose rotational movement is to be sensed.

Figures 22A, 22B, 22C:
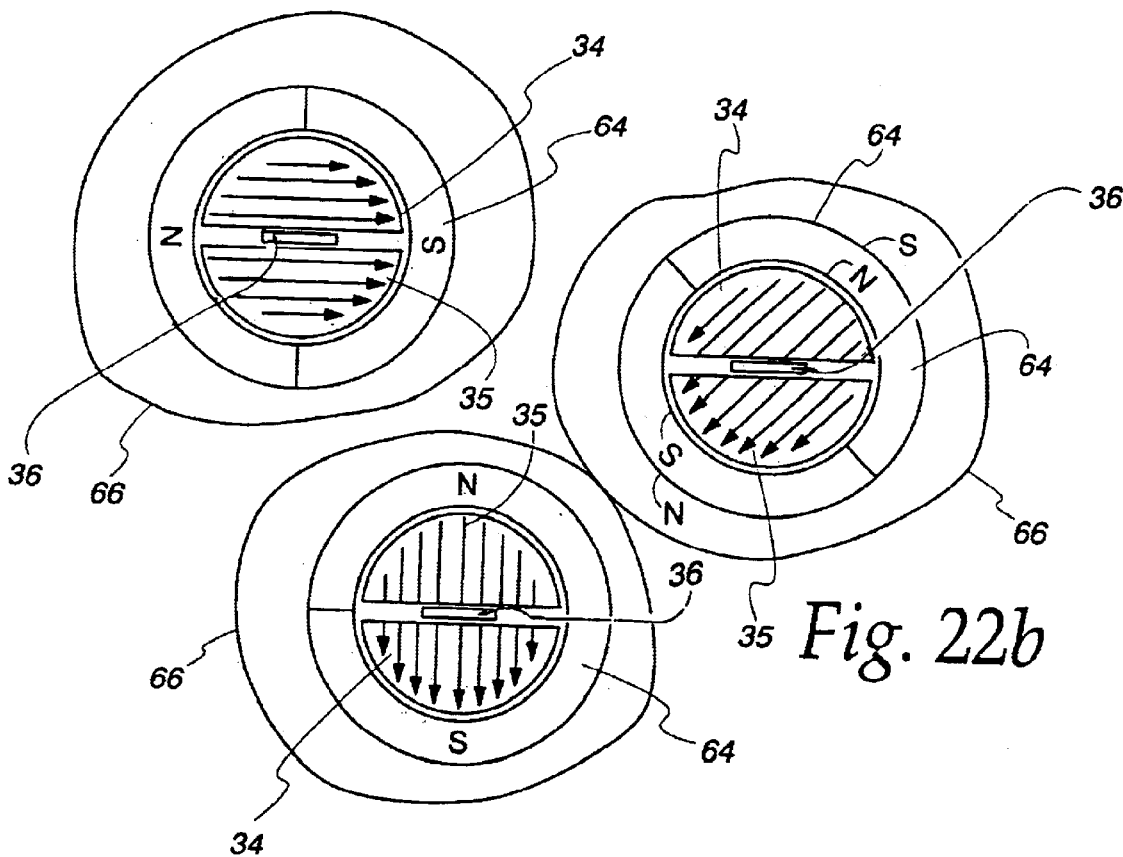
FIGS. 22A–22C illustrate the magnetic circuit for various positions of the magnet relative to the magnetic flux responsive element.

The rotor plate, shown best in FIGS. 13–16, is formed with a rotor cavity 32 for receiving a pair of flux concentrators 34, 35 (FIGS. 4 and 22A–22C) and a magnetic responsive element 36, such as a Hall effect IC. The flux concentrators 34, 35 may be formed from a soft magnetic material with semi-circular cross-section and disposed within the rotor cavity 32 along with the magnetic flux responsive element 36. The flux concentrators 34, 35 are disposed on opposing sides of the magnetic flux responsive element 36 and disposed within the rotor cavity 32 (FIGS. 22A–22C). As shown in FIGS. 4–16, a printed circuit board 38 may be used to provide an electrical connection between the magnetic flux responsive element 36 and a plurality of terminals 40 (FIG. 4) disposed within the main housing 22.

Figure 6:
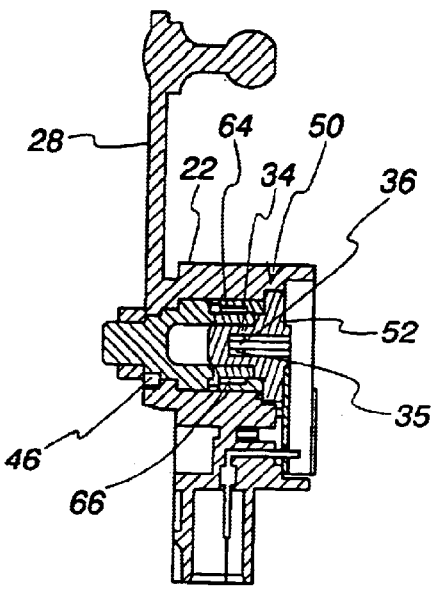
FIG. 6 is a sectional view along the line 6—6 of FIG. 5.
Figure 7:
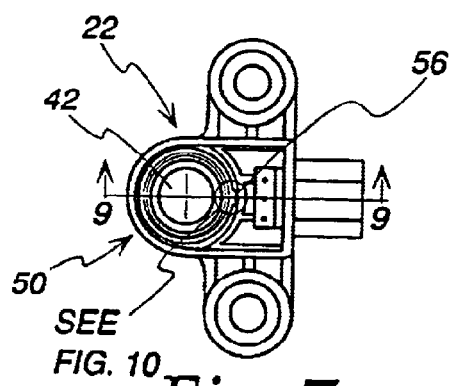
FIG. 7 is a bottom view of a molded housing which forms a part of the present invention.
Figure 8:
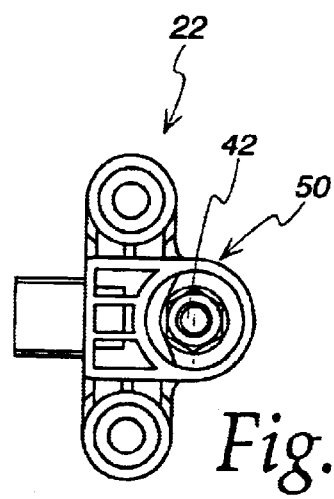
FIG. 8 is a bottom view of the molded housing illustrated in FIG. 7.
Figure 9:
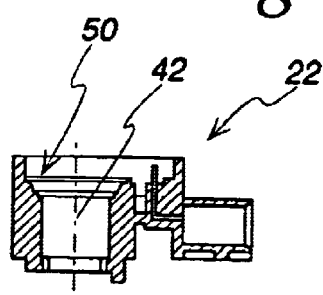
FIG. 9 is a sectional view along the line 9—9 of FIG. 7.

As best shown in FIGS. 1 and 7–10, the molded housing 22 is provided with a central aperture 42 (FIG. 7) for receiving the drive arm assembly 24. As shown in FIG. 3, one end 44 of the molded housing 22 is formed with a reduced diameter portion 46 which contacts an annular shoulder 49 (FIG. 20) on the drive arm assembly 24 to form a stop and limit axial movement of the drive arm assembly 24 in a direction of the arrow 47. The other end 48 of the molded housing 22 is formed with annular stepped surfaces, generally identified with the reference numeral 50 (FIGS. 7–9). The rotor plate 26 is formed with corresponding annular stepped surfaces 52 (FIGS. 3, 6, 13 and 14) that are adapted to mate sonic weld used with the stepped surfaces 50 formed in the molded housing 22 as best shown in FIGS. 3 and 6. These stepped surfaces 50 and 52 may be ultrasonically welded together.

Once the rotor plate 26 and drive arm assembly 24 are assembled to the molded housing 22, minimal clearances, generally identified with the reference numeral 54 (FIG. 3), exist between the drive arm assembly 24 and the rotor plate 26 in an axial direction. In a radial direction, the clearance between the outer surface of the drive arm assembly 24 and the inner surface of the aperture 42 and the molded housing is minimized so as to only enable free rotation of the drive arm assembly 24 within the central aperture 42. As shown in FIG. 3, this interface between a drive arm assembly 24 and the inner walls of the molded housing 22 defined by the central aperture 42 may be lubricated or configured as a self-lubricating bearing as disclosed in commonly-owned co-pending patent application Ser. No. 09/912,953, filed on even date. By configuring the molded housing 22, the drive arm assembly 24 and rotor plate 26 such that minimal clearance exists between these components when assembled, the amount of air space available for ingesting water which can potentially freeze and cause ice lock of the drive arm assembly 24 relative to the molded housing 22 is minimized.

Figure 10:
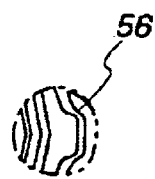
FIG. 10 is a detail of a portion of the housing illustrated in FIG. 7.

The details of the molded housing 22 are illustrated in FIGS. 7–10. As shown in FIGS. 7 and 10, the aperture 42 is formed with a radial slot 56. The radial slot 56 is used to provide radial orientation of the rotor plate 26 relative to molded housing 22. In particular, the rotor plate 26 is provided with a radial tab 58 (FIG. 12). The radial tab 58 is adapted to be received in the radial slot 56 (FIG. 10) to provide radial registration of the rotor plate 26 relative to the molded housing 22.

As shown in FIG. 13, the rotor plate 26 is provided with an axially extending sleeve portion 60. The sleeve portion 60 is adapted to be received in a hollow cavity 62 (FIG. 20) formed in the drive arm assembly 24. As shown in FIGS. 12 and 14–16, the sleeve portion 60 of the rotor plate 26 is formed with a hollow cavity 62 (FIG. 13) for receiving one or more flux concentrators 34, 35 (FIG. 4) and a magnetic flux responsive element 36 and flux shunt, if required. As shown in FIGS. 3 and 6, such a configuration allows the drive arm assembly 24 to rotate relative to the cavity 62 and thus also rotate relative to the flux concentrators 34, 35 and the magnetic flux responsive element 36 (FIG. 4) and optional flux shunt.

As illustrated best in FIG. 20, the drive arm assembly 24 includes a generally circular magnet 64 and shunt ring 66. As shown, the shunt ring 66 circumscribes the circular magnet 64. When the rotor plate 26 and drive arm assembly 24 are assembled to the molded housing 22, as generally shown in FIGS. 3 and 6, the circular magnet 64 as well as the shunt ring 66 are axially aligned with a portion of the annular cavity formed in the axially extending portion 60 of the rotor plate 26 which results in the annular magnet 64 and shunt ring 66 being axially aligned with magnet 64 and shunt ring 66, as best shown in FIG. 6. Accordingly, rotation of the drive arm assembly 24 results in radial displacement of the circular magnet 64 relative to fixed position of the magnetic flux responsive element 36 and flux concentrators 34, as shown in FIGS. 22A–22C and generate a signal representative thereof.

The configuration of the magnet 64 illustrated in FIGS. 22A–22C is merely exemplary. In particular, the magnet 64 is shown as a diametrically charged magnet. The principles of the present invention are applicable to all magnet configurations including radially charged magnets (not shown).

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A rotary position sensor comprising:
    a sensor housing formed with a central aperture defining a drive arm cavity;
    a drive arm assembly configured to be rotatably mounted within said central aperture defining a first interface, said drive arm assembly formed with a hollow sleeve on one end defining a rotor cavity and an outwardly extending stud on an opposing end for connection to an external linkage, said drive arm assembly including a circular magnet and a shunt ring concentrically mounted with respect to said hollow sleeve; and
    a rotor plate formed with a disk configured to close said central aperture on one end and a hollow shaft configured to receive said rotor cavity, said hollow shaft configured to receive a magnetic flux responsive element and one or more flux concentrators, said rotor plate, drive arm assembly and sensor housing configured with uniform cross-sections, so as to form generally smooth surfaces therebetween.

2. The rotary position sensor as recited in claim 1, wherein one end of said drive arm cavity is formed as an annular stepped surface for receiving said rotor plate.

3. The rotary position sensor as recited in claim 2, wherein said rotor plate is formed with a stepped surface for mating with said step surface formed in said drive arm cavity.

4. A rotary position sensor as recited in claim 1, wherein said one or more flux concentrators are formed with a semicircular shape.

* * * * *